United States Patent [19]

Godot

[11] 3,886,691

[45] June 3, 1975

[54] MACHINE FOR TRIMMING AND BEVELLING OPHTHALMIC LENSES

[75] Inventor: Jean-Marie Godot, Brunoy, France

[73] Assignee: Essilor International, Joinville Lepont, France

[22] Filed: Oct. 9, 1974

[21] Appl. No.: 513,391

[30] Foreign Application Priority Data

Oct. 9, 1973 France .............................. 73.35999

[52] U.S. Cl. .......................................... 51/101 LG
[51] Int. Cl. ............................................. B24b 9/14
[58] Field of Search ............ 51/101 R, 101 LG, 284

[56] References Cited
UNITED STATES PATENTS

| | | | |
|---|---|---|---|
| 3,087,285 | 4/1963 | Lissac............................ | 51/101 LG |
| 3,121,979 | 2/1964 | Gray............................... | 51/101 LG |

FOREIGN PATENTS OR APPLICATIONS

| | | | |
|---|---|---|---|
| 2,004,662 | 10/1971 | Germany........................ | 51/101 LG |

Primary Examiner—Donald G. Kelly
Assistant Examiner—Nicholas P. Godici

[57] ABSTRACT

Machine for trimming and bevelling ophthalmic lenses, of the type comprising a frame structure and a support in which the lens-holding spindle is rotatably mounted, said support being connected and guided in relation to said frame structure in such a manner that, during the penetration of the tool into the lens material and operative portion of the tool remains substantially on a portion of a so-called meniscus sphere, centered to the spindle axis and located within the thickness of said lens. The support is connected to the frame via a connecting-rod of same length as the radius of said meniscus sphere, and by another pair of connecting-rods of equal length, parallel to each other and pivoted on the one hand to said frame structure, each by means of a universal joint, and on the other hand to the spindle support, each by means of a pivotal connection having its axis perpendicular to the spindle axis but not intersecting the line interconnecting the centres of said universal joints. (FIG. 4)

2 Claims, 6 Drawing Figures

MACHINE FOR TRIMMING AND BEVELLING OPHTHALMIC LENSES

BACKGROUND OF THE INVENTION

1. Field of the Invention

The present invention relates to machines for trimming and edge-grinding ophthalmic or spectacle lenses, of the type comprising essentially a frame supporting a tool and a feeler adapted to engage a trimming templet, the tool and the feeler defining together a feeler-tool line, a rotatably driven spindle for supporting said templet and a lens to be edged, and having its axis parallel to said feeler-tool line, a support movable in relation to said frame and having said spindle rotatably mounted therein, connecting and guide means for connecting said support to said frame and guiding same in such a manner that, during the penetration of said tool into the lens material as a consequence of the relative movement between said frame and said spindle support, and operative portion of the tool remains substantially on a portion of a so-called meniscus sphere, centered to the spindle axis and located within the lens thickness.

2. Description of the Prior Art

Machines of this type are already known through the French Pats. Nos. 1,262,435 and 1,312,689.

In the machine described in the first-mentioned French Pat. No. 1,261,435 the axis of the lens-holding spindle and the above-defined feeler-tool line remain constantly in a same common plane and the spindle support can slide on the frame with a plane-to-plane movement parallel to the plane containing the spindle axis and the feeler-tool line, said support being guided by a pair of links constituting together with said frame and the spindle support proper a deformable parallelogram, both links of the pair having a length equal to the radius of the desired meniscus sphere. Moreover, if the machine comprises several tools, i.e., several grinding wheels, namely a wheel for rough-grinding and a fine or finishing grinding wheel, spaced a certain distance along said feeler-tool line, some slideway means comprising a movable slide having said pair of links and said spindle support mounted thereon must be provided so that the assembly of said pair of links and spindle support can be moved in a direction parallel to said feeler-tool line, and the ophthalmic lens to be trimmed and bevelled can be brought in succession within grinding reach of the two or more grinding wheels.

In the machine disclosed in the French Pat. No. 1,312,689, the axis of the lens-supporting spindle and the feeler-tool line remain likewise in a same plane and the spindle support is adapted to slide in relation to the machine frame while being guided on the one hand by a pair of slideways extending in two directions perpendicular to each other and on the other hand by a meniscus-forming connecting-rod pivoted at one end to said spindle support and at the opposite end to the machine frame, the length of this rod between its pivot points being equal to the radius of the desired meniscus sphere.

A common feature in the two above-mentioned prior art machines is that the arrangement must compulsorily comprise means whereby the spindle support can slide on the frame either directly or through the medium of guiding slideways. Now, since in operation these sliding movements take place continuously with periodical or intermittent reversals of the direction of movement, and since on the other hand these sliding movements must be very smooth, the surfaces in relative sliding contact must be machined very accurately to close tolerances, and be perfectly polished. Since the spindle support is a member of relatively large dimensions, the guiding surfaces themselves must have likewise relatively large areas in order to ensure a proper guiding action, and since this entails extemely accurate machining operations, the general cost of the machine is increased accordingly and considerably. Moreover, as a consequence of the guiding system used in these known machines, the spindle support must be relatively sturdy and bulky, thus increasing its inertia and making it necessary to provide a likewise strong and massive machine frame structure, and further burdening the final cost of the machine.

SUMMARY OF THE INVENTION

It is the essential object of the present invention to avoid the inconveniences charactising hitherto known ophthalmic lenses trimming and bevelling machines by providing a machine of the type broadly set forth hereinabove but considerably lighter in weight, of reduced overall dimensions and comprising a mechanical connecting and guiding system considerably simpler and more economical than those used in hitherto known machines of this type.

To this end, the invention provides a machine for trimming and bevelling ophthalmic lenses, which comprises a frame carrying a tool and a contact feeler adapted to engage a trimming templet, said tool and contact feeler defining a feeler-tool line, a rotatably driven spindle for supporting said templet and a lens to be edged, and having its axis parallel to said feeler-tool line, a support movable in relation to said frame and having said spindle rotatably mounted therein, connecting and guide means for connecting said spindle support to said frame and for so guiding said support that, when said tool penetrates into the lens material as a consequence of the relative movement between said frame and said spindle support, an operative portion of the tool remains substantially on a portion of a so-called meniscus sphere which is centered to the spindle axis and located within the lens thickness, said connecting and guide means comprising a pair of connecting-rods of same length, parallel to each other and pivoted at one end to said spindle support and at the other end to the frame, characterized in that a universal joint is provided for pivotally connecting each connecting-rod to said frame, the centres of said universal joints being aligned on a straight line parallel to said feeler-tool line.

With this arrangement, it is no longer necessary to use vary accurately machined sliding-contact surfaces of relatively large area and of very smooth surface conditions. In contrast thereto, with the arrangement of this invention it is only necessary to provide pivot bearings and ball-and-socket joints (which may also consist of Hooke's couplings or universal couplings) of a standard, currently available commercial type, and on the other hand the spindle support and, consequently, the machine frame can be constructed in a considerably lighter fashion with appreciably reduced overall dimensions.

A detailed description of a typical form of embodiment of this invention will now be described by way of example with reference to the attached drawings, in which:

DESCRIPTION OF THE PREFERRED EMBODIMENT

Figure 3:
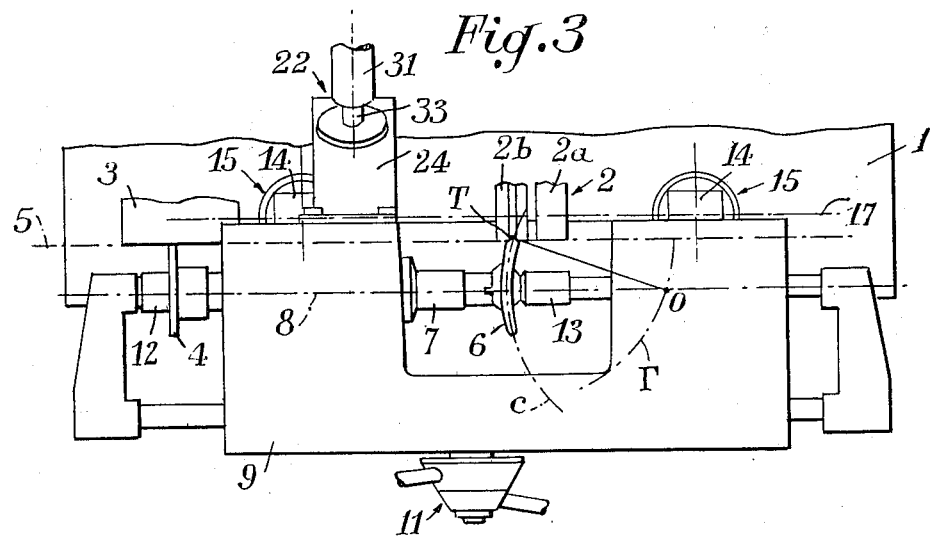
FIG. 3 is a fragmentary plane view showing the principals component elements of the machine shown in FIGS. 1 and 2.
Figure 2:
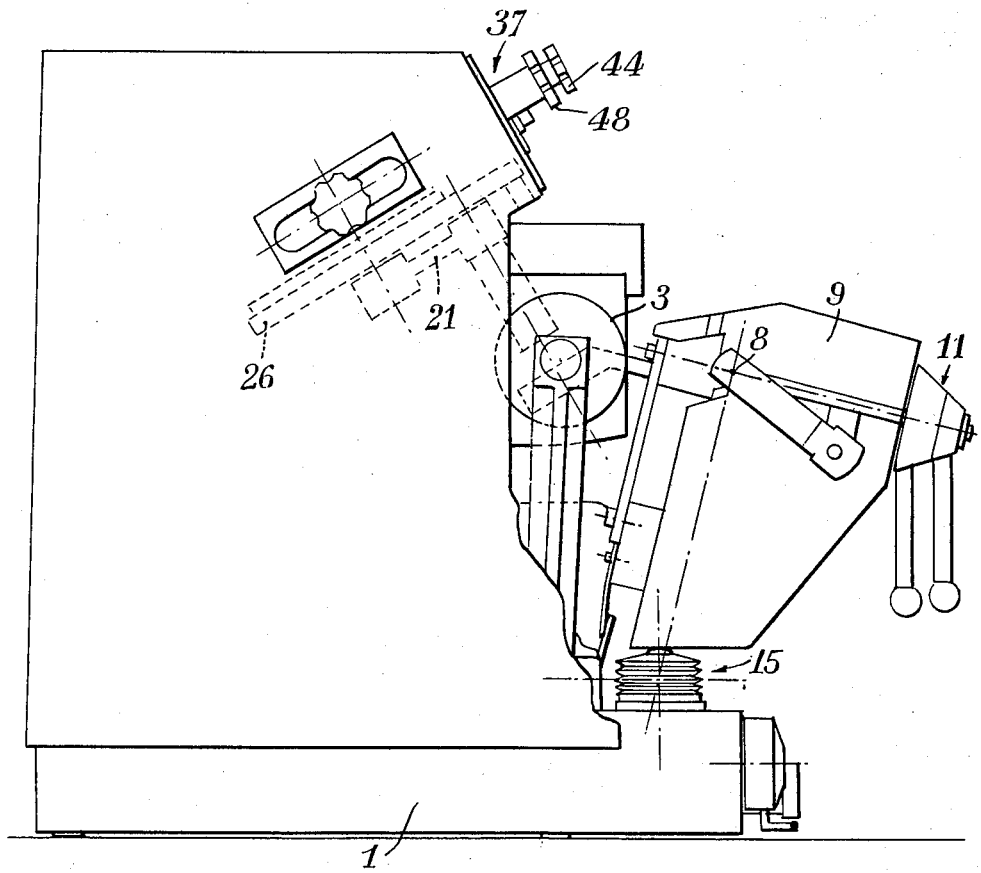
FIG. 2 is a side elevational view of the machine illustrated in FIG. 1.

The machine for trimming and bevelling ophthalmic lenses according to this invention is illustrated diagrammatically in the appended drawings as consisting essentially of a frame 1 supporting a tool 2 and a contact feeler 3 for a trimming templet 4, the tool 2 and feeler 3 defining a feeler-tool line 5 (FIG. 3). The tool 2 may comprise for example a pair of grinding wheels, i.e. a wheel 2a for rough grinding and a finishing or bevelling wheel 2b; these grinding wheels are disposed side-by-side along said feeler-tool line 5 and driven for rotation about their axes by motor means not shown. The trimming templet 4 and the ophthalmic lens 6 to be trimmed (visible only in FIG. 3 of the drawings) are mounted in a manner known per se at the ends of a rotary spindle 7 so as to be rotatably driven theeby. The spindle 7 having its axis 8 disposed parallel to the feeler-tool line 5 is rotatably mounted in a support or auxiliary frame 9 movable in relation to the main frame 1, and is driven from motor means (not shown) which may be mounted either in said support 9 as in known machines of this type, or preferably on the main frame of the machine in order to relieve the movable support 9 from a substantial mass and thus reduce its inertia. These motor means are not a part of the invention and, therefore they will not be described in detail since they can be easily designed by anyone ordinary skilled in the art. The support 9 also carries in a manner known per se control means 11 adapted to produce the axial movements of clamping jaws 12 and 13 in a direction to clamp the templet 4 and lens 6 on the relevant ends of spindle 7 or in the opposite direction to release these elements there from.

Figure 1:
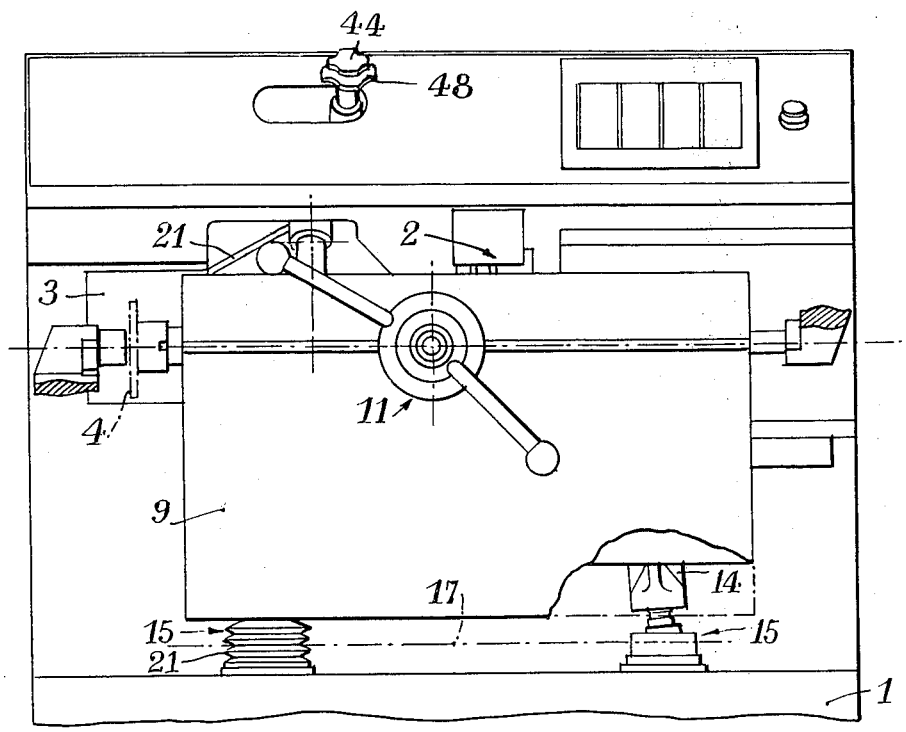
FIG. 1 is an elevational view of a machine for trimming and bevelling ophthalmic lenses, constructed according to the teachings of this invention.

The support 9 is connected and guided in relation to the frame 1 by connecting and guide means to be described hereinafter. These connecting and guiding means are so arranged that when the tool 2 is caused to engage the lens 6 as a consequence of the relative movement between the frame 1 and said support 9, the operative portion of the tool, designated by the reference letter T in FIG. 3, constantly lies on a portion C of a circular arc (more exactly to a portion of a so-called meniscus sphere, considering the movement of rotation of the lens 6 about the axis 8 of spindle 7), said arc or spherical portion C being centered to said spindle axis 8 and lying within the thickness of the lens 6. To this end, the aforesaid connecting and guide means comprise a pair of connecting-rods 14 of same length, parallel to each other and each pivoted at one end to the frame 1 by means of a Hooke's or universal joint 15 and at the opposite end to said support 9 by means of a bearing assembly 16. The centres of rotation of the pair of Hooke's or universal joints 15 are aligned on a common straight line 17 (FIG. 1 and 3) parallel to the feeler-tool line 5 and also to the spindle axis 8, and the bearing assemblies 16 have their axes 19 (FIG. 4) perpendicular to the spindle axis 8 without intersecting the line 17 interconnecting the centres of rotation of said Hooke's or universal joints. As clearly illustrated in FIG. 4, each axis 19 is perpendicular to the plane containing the spindle axis 8 and line 17 (not shown in FIG. 4, but perpendicular to the plane of this figure at the center of universal joint 15). The pivotal connections 15 and 16 may consist of standard, commercially available means well known in the art, whereby the construction of the machine according to this invention is greatly facilitated and more economical. Besides, although in FIGS. 1 and 4 the universal joints 15 are shown as consisting of a ball-and-socket joint of the conventional spherical type, it is clear that a Hook's or any other similar universal joint may substituted therefor. Bellows 21 made of suitable elastic material enclose these joints 15 to protect them against the ingress of detrimental dust.

By virtue of the above-described mounting, the support 9 can perform such movements with respect to the frame 1 that the spindle 7 can be moved towards and away from the feeler-tool line 5 and in either direction while remaining parallel to said line 5.

However, these two connecting-rods 14 are not sufficient for so guiding the support 9 that the operative point T of tool 2 remains permanently on the meniscus sphere C during the penetration of this tool 2 into the lens material 6. This desired result may be obtained in a manner known per se by either using a meniscus cam (as illustrated for example in FIG. 9 of the above-mentioned French Pat. No. 1,261,435) or resorting to the solution according to the instant embodiment consisting of a meniscus-forming rod pivoted at one end to the frame 1 and at the opposite end to said support 9, the length of said meniscus-forming rod corresponding to the radius of the meniscus sphere, that is, to the segment OT of FIG. 3. In this Figure it will be noted that if the operative point T of tool 2 remains constantly on the meniscus sphere C while moving in relation to the lens 6, the centre of the meniscus sphere, i.e. the point O of axis 8, will travel on a sphere centered at T and having a radius OT during the movement of spindle 7 in relation to said tool 2. From the foregoing it will be seen that to obtain the desired guiding action of support 9 carring the spindle 7, the above-mentioned meniscus-forming rod must have a length (measured between its pivoted end points connecting same to the frame 1 and support 9, respectively) equal to the length of the above-defined segment OT, and that these two pivot points of the meniscus-forming rod on the one hand and the points T and O on the other hand must lie at the four apices of a deformable parallelogram having as fixed apices said point T and the centre of the pivotal connection between said meniscus-forming rod and said frame 1.

Figure 6:
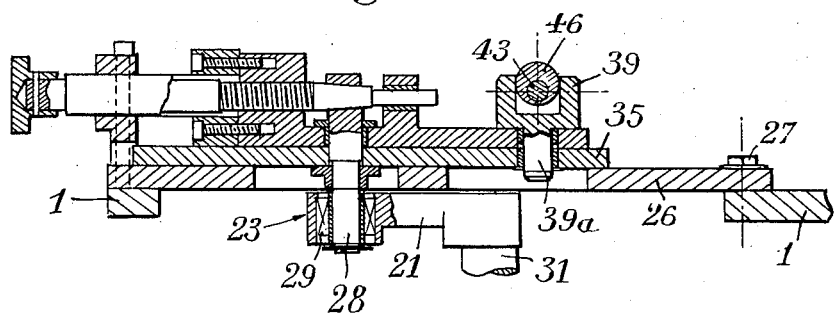
FIG. 6 is a section taken along the line VI—VI of FIG. 5.
Figure 4:
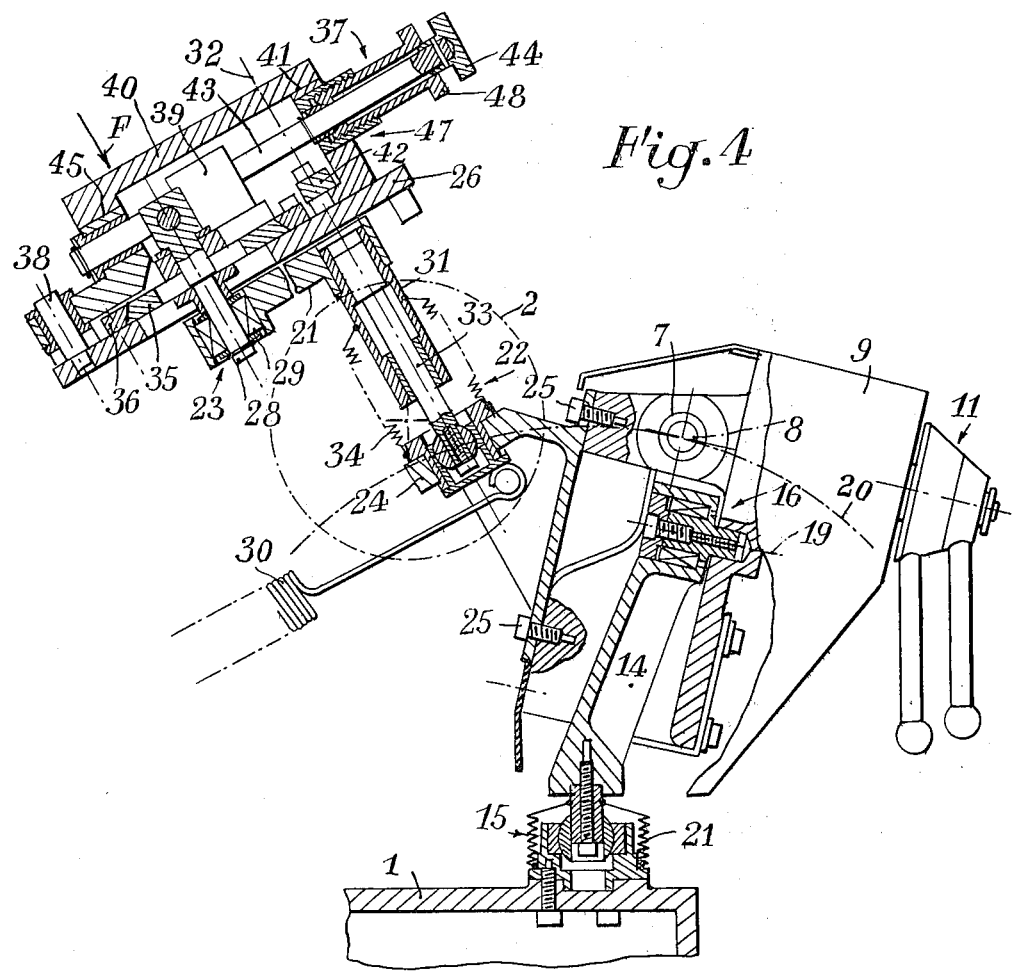
FIG. 4 is a vertical section showing on a larger scale the manner in which the lens-holding support is connected and guided in relation to the frame of the machine.
Figure 5:
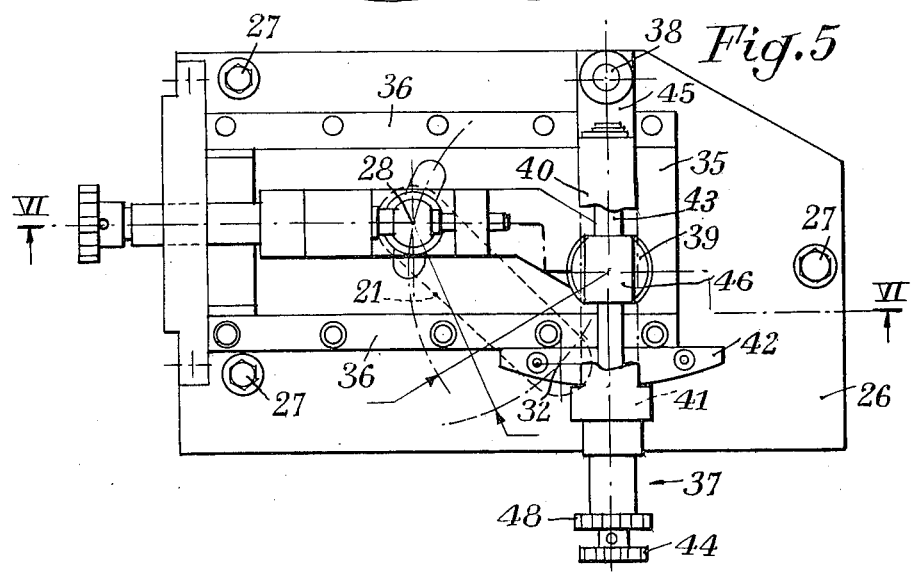
FIG. 5 is a view taken in the direction of the arrow F of FIG. 4, showing a detail.

FIGS. 4, 5 and 6 illustrate the manner in which this meniscus-forming rod may be constructed in actual practice. In these FIGS. 4, 5 and 6 the meniscus-forming rod is designated by the reference numeral 21 and its pivotal connections with the support 9 and frame 1 are designated by the reference numerals 22 and 23, respectively. More particularly, the pivotal connection 22 is carried by a bracket 24 secured by screws 25 to said support 9, and the other pivotal connection 23 is supported, in a manner to be described more in detail presently, by a plate 26 rigidly secured by means of screws 27 to said frame 1.

The meniscus-forming rod 21 comprises essentially an arm having one end pivoted at 23 to a pivot axis 28 by means of a ball bearing 29, and its other end provided with a socket 31 having its axis 32 parallel to the axis of said pivot axis 28, the distance between these axes being equal to the length of said segment OT of FIG. 3, i.e. to the radius of the meniscus sphere. Slidably mounted in the bore of said socket 31 is a rod 33 having its lower end projecting from socket 31 pivoted at 22 to said bracket 24 by means of a universal or a Hooke's joint, for example a ball-and socket joint. The provision of this universal joint and the possibility for the rod 33 to slide axially in said socket 31 are made necessary by the fact that the centre of the pivotal connection 22 is movable not in a plane during the movements of support 9 about the line 17 interconnecting the centres of the universal joints 15, but substantially on the surface of a cylinder of which the axis is coincident with this line 17. Moreover, by construction, when the connecting-rods 14 are perpendicular to the axis 8, the distance between the axis 8 and the centre of is equal to the distance between centre 22 and centre of said universal joint 15 measured in the plane of FIG. 4, as shown by the circular arc 20 in dash and dot lines in this Figure centered to the centre of universal joint 15. A bellows 34 of suitable elastic material is also provided for protecting the universal joint 22 against the ingress of detrimental dust.

A tension spring 30 having one end anchored to the support 9 and the other end (not shown) anchored to the frame 1 of the machine constantly urges the support 9 and spindle 8 towards the feeler-tool line 5. Preferably, the position of the point of anchorage of tension spring 30 on frame 1 is made adjustable so that the pressure exerted by the lens 6 on the tool 2 can be adjusted by tensioning more or less the spring 30. This possibility of adjustment may be obtained for example by connecting the other end of spring 30 to one end of a cable having its opposite end attached to the outer surface of a drum. Thus, by winding said cable more or less on said drum, the tension of spring 30 and therefore the pressure exerted by the lens 6 on tool 2 can be adjusted at will.

As already explained in the foregoing, the tool 2 may comprise a plurality of grinding wheels, for example a wheel 2a for rough-grinding and another wheel 2b for finishing the lens, which are disposed side-by-side along the feeler-tool line 5. Under these conditions, to bring the lens 6 to be trimmed and bevelled firstly in front of grinding wheel 2a and then in front of grinding wheel 2b, the arrangement must be such that the support 9 holding the spindle 7 can be moved in a parallel direction to axis 8 or line 5. According to another feature characterizing this invention, this result can be achieved by moving the pivot axis 28 of the meniscus-forming rod 21 in either direction along a line parallel to said axis 8 and also to the feeler-tool line 5.

To this end, the pivot axis 28 is carried by a plate 35 adapted to slide on plate 26 and guided laterally by slideways 36 secured to plate 26 on either side of plate 35, said slideways 36 extending in a direction parallel to the axis 8. The plate 35 is adapted to be moved between the guiding members 36 under the control of a lever assembly 37 having one end pivoted to the plate 26 by means of a pivot pin 38 extending at right angles to said plate. A part 43 of this lever assembly 37 extends between the two arms of a fork member 39 pivoted by means of an integral pivot pin 39a to said plate 35. Thus, when the control lever assembly 37 is pivoted about pivot pin 38, it causes the plate 35 to slide by reacting against one or the other arm of fork member 39, so that a rough adjustment of the position of support 9 can be achieved.

The control lever assembly 37 comprises a substantially L-shaped member 4 of which the base or foot portion is adapted to slide between the plate 26 and a strap 42 secured to this plate 26 so as to extend parallel to and with a certain spacing from said plate 26, this spacing corresponding to the thickness of said base portion of member 41 with the necessary play. Indexing or detent-positioning means (not shown) are provided for acting between the member 41 and the strap 42 in order to determine two positions of said control lever 37 which correspond to two predetermined positions of plate 35 and, therefore, to two predetermined positions of support 9, namely for rough grinding and finishing the lens. These indexing or detent-positioning means may consist for instance of a ball carried by said member 41 and urged by a spring for engagement into either of a pair of part-spherical cavities formed at suitable locations in said strap 42.

This control lever assembly 37 is also arranged to permit a fine adjustment of the position of support 9 in the aforesaid rough-grinding and finishing positions. To this end, the control lever assembly 37 comprises a rod 43 having one end provided with a control knob 44 and the other end rotatably mounted in one of the arms of another L-shaped member 45 having its other arm pivoted to said plate 26 by means of a pivot pin 38. The L-shaped members 41 and 45 are interconnected by means of a bridging member 40 secured to these two L-shaped members with a view to impart the necessary rigidity to the control lever assembly 37. A cylindrical member 46 having its axis off-set in relation to the axis of rod 43 to constitue an eccentric is secured to this rod 43, intermediate the ends thereof. The cylindrical, essentric-forming member 46 bears on opposite sides against the arms of fork member 39. Thus, when this cylindrical member 46 is rotated by means of control knob 44, the operator can move the plate 35 between the guide members 36 and thus finely adjust the position of support 9 along the feeler-tool line 5. A clamping device 47, for example of the wedge type adapted to be actuated by means of a control knob 48, is provided for blocking the rod 43 against rotation upon completion of the fine adjustment operation.

It will be noted that the slideway system comprising the plate 35 and guide members 36 described hereinabove does not require a standard of machining and finishing precision as high as required for slideways used in hitherto known trimming and bevelling machines since during the rough-grinding and finishing operations carried out on the edge of the ophthalmic lens the plate 35 is not caused to slide permanently as in known prior art machines, but remains stationary. Moreover, the slideway assembly comprising the plate 35 and guide members 36 has relatively small dimensions compared with slideways used in hitherto known machines, for the slideway means used in the present invention has not in actual service to carry the whole support 9 and part mounted thereon, but is merely carries the pivot axis 28 of arm 21, and besides the movements performed by said plate 35 have a relatively low amplitude.

The ophthalmic lens trimming and bevelling machine according to this invention is also provided with a device for adjusting the radius of the meniscus sphere. However, since this adjustment device could also be used with trimming and bevelling machines of other types not comprising the connecting and guide means according to this invention, which are provided for connecting and guiding the support 9 in relation to the main frame 1, this adjustment device is described in a co-pending patent application Ser. No. 513,497 filed by the same Applicant on Oct. 9, 1974 for "Improvements in Machine for Trimming and Bevelling Ophthalmic Lenses", to which reference may be made for further details.

Of course, the embodiment of the invention which has been described hereinabove with reference to the attached drawings should not be construed as limiting the scope of the invention since many modifications and variations may be brought thereto without departing from the basic principles of the invention as set forth in the appended claims. Thus, notably, a suitably shaped cam associated with a cam follower may be substituteed for the meniscus-forming rod 21, the cam being secured to the frame or the spindle support, the cam follower being secured to the spindle support or the frame, and being constantly urged against said cam by suitable spring or elastic means.

What is claimed as new is:

1. A machine for trimming and bevelling ophthalmic lenses, comprising a frame structure carrying a tool and a contact feeler adapted to engage a trimming templet, said tool and contact feeler determining together a feeler-tool line, a rotatably driven spindle for supporting said templet and a lens to be edged, and having its axis parallel to said feeler-tool line, a support movable in relation to said frame and having said spindle rotatably mounted therein, connecting and guide means for connecting said spindle support to said frame and for so guiding said spindle support that, during penetration of the tool into the lens material as a consequence of the relative movement between said frame and said spindle support, an operative portion of the tool remains substantially on a portion of a so-called meniscus sphere centred to the spindle axis and located within the lens thickness, said connecting and guide means comprising a pair of parallel connecting-rods of same length, pivoted at one end to said spindle support and at the opposite end to said frame, a universal joint being provided for pivotally connecting each connecting-rod to said frame, the universal joints having their centres aligned on a straight line parallel to said feeler-tool line.

2. A machine as set forth in claim 1, wherein said tool comprises a plurality of grinding wheels disposed side-by-side and spaced along said feeler-tool line, and wherein said connecting and guide means comprise a meniscus-forming rod pivoted at one end to said frame and at the other end to said spindle support, the length of said meniscus-forming rod being equal to the radius of the meniscus sphere, said machine further comprising second guide means permitting movements of the pivotal connection of said meniscus-forming rod in relation to said frame in a direction parallel to said feeler-tool line, and control means for moving said pivotal connection in one and the other way in said direction whereby said ophthalmic lens to be trimmed and bevelled can be brought in succession in front of the various grinding wheels of the machine.

* * * * *